Figure 1:
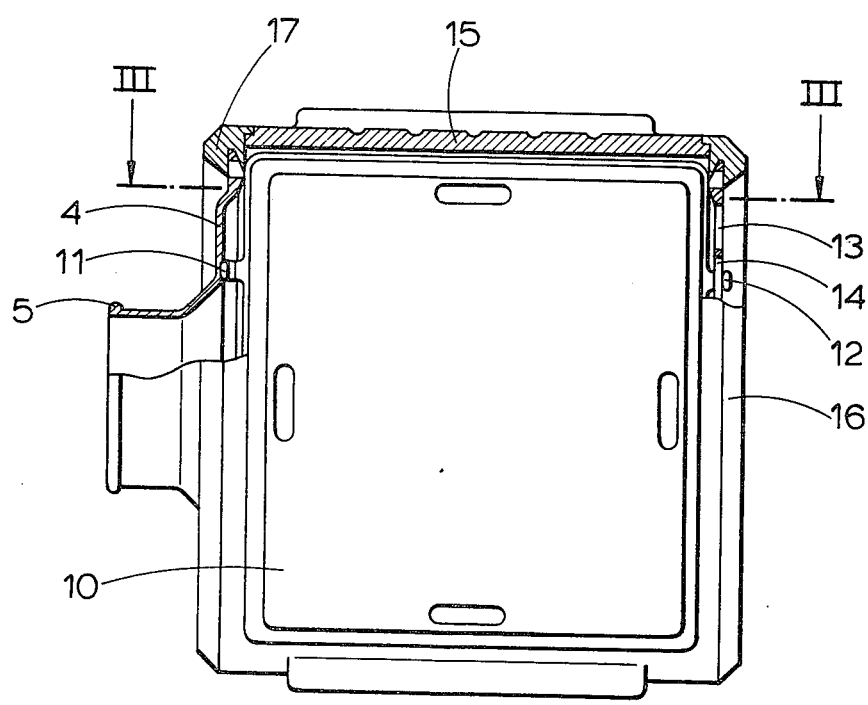

United States Patent [19]

Sundseth

[11] 4,438,057

[45] Mar. 20, 1984

[54] AIR FILTERS

[76] Inventor: Jarl Sundseth, 23 Lennox Gardens, London S.W. 1, England

[21] Appl. No.: 285,473

[22] Filed: Jul. 21, 1981

[30] Foreign Application Priority Data

Jul. 23, 1980 [GB] United Kingdom .................. 8024020
Feb. 3, 1981 [GB] United Kingdom .................. 8103255

[51] Int. Cl.³ .......................................... B29C 27/00
[52] U.S. Cl. ..................... 264/46.5; 55/493;
55/482; 55/502; 55/DIG. 5; 55/521; 55/497;
210/493.1; 264/251; 264/254; 264/261;
264/271.1; 264/DIG. 48
[58] Field of Search ................. 55/493, 487, 497–500,
55/482, 502, 521, 503, 505, 514, DIG. 5;
210/493, 232; 264/263, 251, 254, 261, 271.1,
46.5, DIG. 48; 249/170, 171

[56] References Cited

U.S. PATENT DOCUMENTS

| | | | |
|---|---|---|---|
| 2,569,243 | 9/1951 | Kovacs | 210/169 |
| 3,183,286 | 5/1965 | Harms | 55/497 |
| 3,258,900 | 7/1966 | Harms | 55/500 |
| 3,397,518 | 8/1968 | Rogers | 55/497 |
| 3,494,466 | 2/1970 | Rose et al. | 210/446 |
| 3,712,033 | 1/1973 | Groholz | 55/493 |
| 3,778,985 | 12/1973 | Daigle et al. | 55/497 |
| 3,880,627 | 4/1975 | Morton | 55/521 |
| 4,056,378 | 11/1977 | Schuldenfrei | 55/514 |
| 4,113,627 | 9/1978 | Leason | 210/DIG. 48 |
| 4,199,378 | 4/1980 | Hladik | 55/DIG. 5 |
| 4,227,953 | 10/1980 | Wasielewski et al. | 55/502 |

FOREIGN PATENT DOCUMENTS

| | | |
|---|---|---|
| 1951184 | 4/1971 | Fed. Rep. of Germany . |
| 2104675 | 8/1972 | Fed. Rep. of Germany ........ 55/497 |
| 564366 | 9/1975 | Switzerland ........................ 55/502 |
| 1075732 | 7/1967 | United Kingdom . |
| 1150442 | 4/1969 | United Kingdom . |
| 1423529 | 2/1976 | United Kingdom . |
| 1423815 | 2/1976 | United Kingdom . |
| 1426208 | 2/1976 | United Kingdom . |
| 1439831 | 6/1976 | United Kingdom . |
| 1446195 | 8/1976 | United Kingdom . |
| 1447829 | 9/1976 | United Kingdom . |
| 2009616 | 6/1979 | United Kingdom . |
| 2010210 | 6/1979 | United Kingdom . |
| 1570385 | 7/1980 | United Kingdom . |

OTHER PUBLICATIONS

E.P.C. Publication No. 8,018; Published Feb. 20, 1980.

Primary Examiner—Bernard Nozick
Attorney, Agent, or Firm—W. R. Hulbert

[57] ABSTRACT

Air filter elements employing a block of deep pleated paper and methods of their construction. A preferred filter element comprises top and bottom end members both adapted for through passage of air and a first pair of side walls, a block of deep-pleated paper between the end members and the side walls, connections between adjacent edges of the end members and the side walls, at least two connections being hinged and at least one connection being interengaging elements, sealing structure comprising a second pair of side walls and at least one flange around one end member, the material of which structure rigidifies the connections and forms a seal with the pleated paper. The sealing structure is formed preferably from an elastomer which solidifies in situ.

In a preferred method of construction the first side walls are hinged up from the bottom wall around the pleated paper block and connected at the top. The second side walls and end flanges are then formed of elastomeric material. Various other filter elements and constructional methods are described.

4 Claims, 14 Drawing Figures

AIR FILTERS

This invention relates to air filters, and more particularly to air filter elements and methods of their construction. In this aspect the invention is especially concerned with elements employing a block of deep pleated paper (which term is used broadly herein to include any alternative or similar material).

In one aspect the invention provides a filter element comprising a bottom end member adapted for through passage of air and a first pair of side walls, a block of deep-pleated paper on the end member and between the side walls, connections between adjacent edges of the end member and the side walls, a connection between the side walls at the top of the element, and sealing structure comprising a second pair of side walls and at least one end flange the material of which structure forms a seal with the pleated paper. Preferably a flange is formed about both top and bottom of the element, and a top member is provided having a hinge connection with the side walls.

In a more limited aspect the invention provides a filter element comprising top and bottom end members both adapted for through passage of air and a first pair of side walls, a block of deep-pleated paper between the end members and the side walls, connections between adjacent edges of the end members and the side walls, at least two connections being hinges and at least one connection being interengaging elements, sealing structure comprising a second pair of side walls and at least one flange around one end member, the material of which structure rigidifies the connections and forms a seal with the pleated paper. The sealing structure is formed from a material or materials which solidifies in situ.

The invention includes a method of making a filter element as above set forth.

In all cases the material of the second side walls and/or flange or flanges, which is preferably an elastomeric material such as foamed polyurethane, forms the required seals with the pleated paper.

Also the material of the side walls and/or flanges rigidifies the connections. In preferred embodiments employing hooked projections engaging holes the material enters the holes forming a mechanical connection. This is particularly valuable where no adhesive effect can be achieved. The hinge connections can be of widely different degrees of flexibility but in general such as to require additional support for the desired rigidity. With the material surrounding the hinge connections they can of course no longer act as hinges.

The invention lends itself to various modes of construction and assembly. If tooling cost is a paramount consideration the side walls and top and bottom members can be formed from two simple mouldings. Adjacent edges are then connected by projection-and-hole connections, four in all. Alternatively one end member and one side wall can be formed as a single flat moulding with a flexible connection. Two similar such mouldings can be folded around the paper block and connected by a pair of projection and hole connections.

In another arrangement the bottom member and two side walls are formed as a single flat moulding, erected around a paper block, and assembled by projection-and-hole connections with the top member.

If greater tooling cost can be offset by greater production, a single flat moulding can comprise both end members and both side walls, with flexible connections between them. The moulding is then wrapped around the block and the free edges secured with a single projection-and-hole connection.

The expressions "top" and "bottom" are arbitrary and used simply for ease of description.

Figure 2:
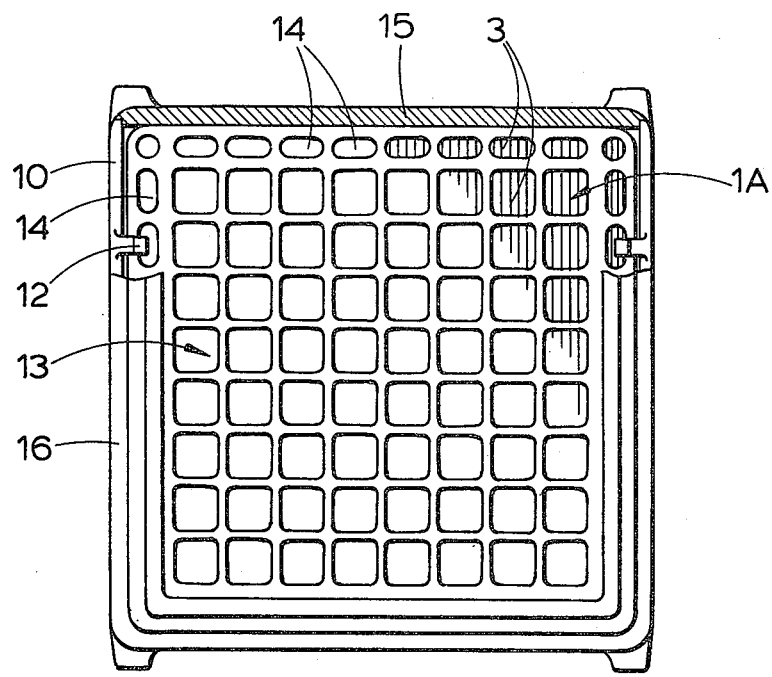
Figure 3:
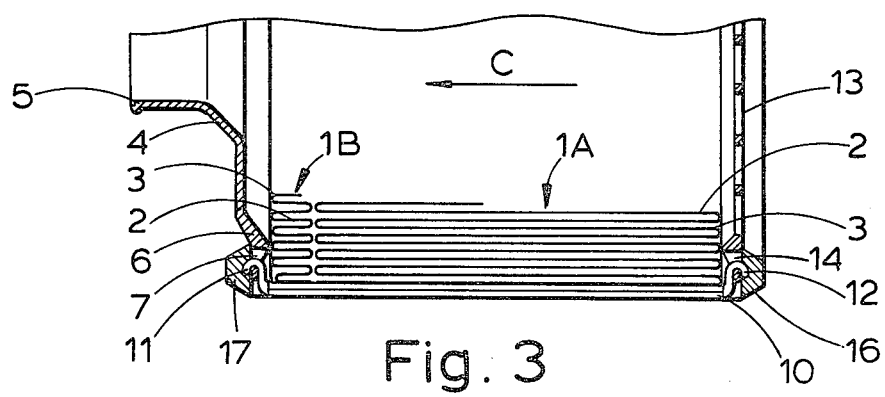
Figure 4:
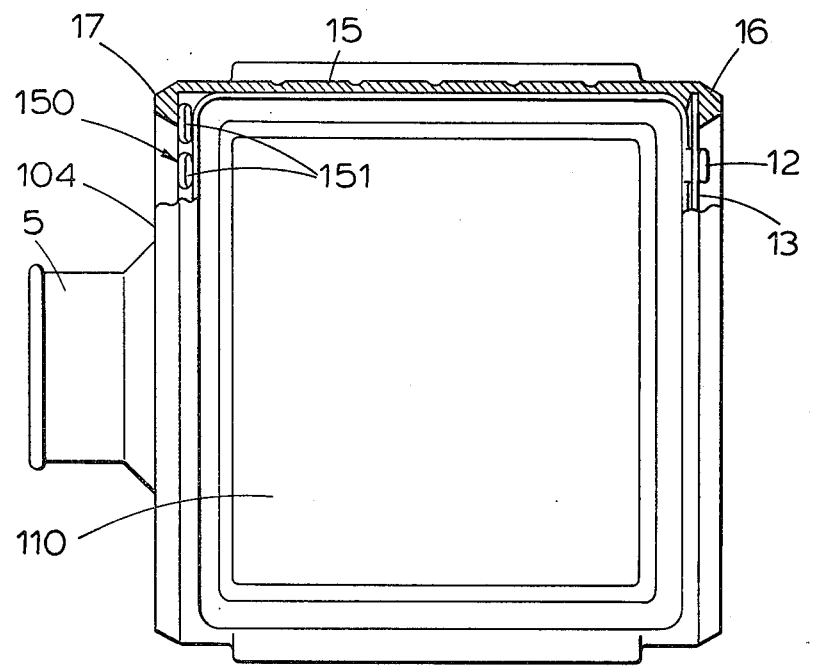
Figure 5:
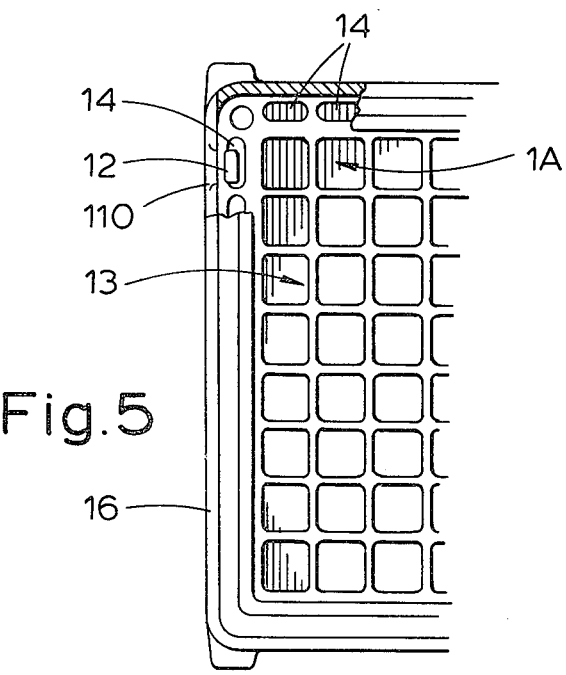
Figure 6:
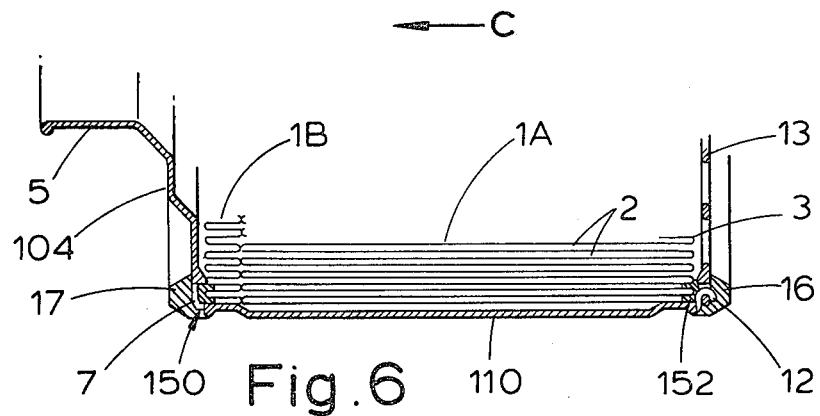
Figure 7:
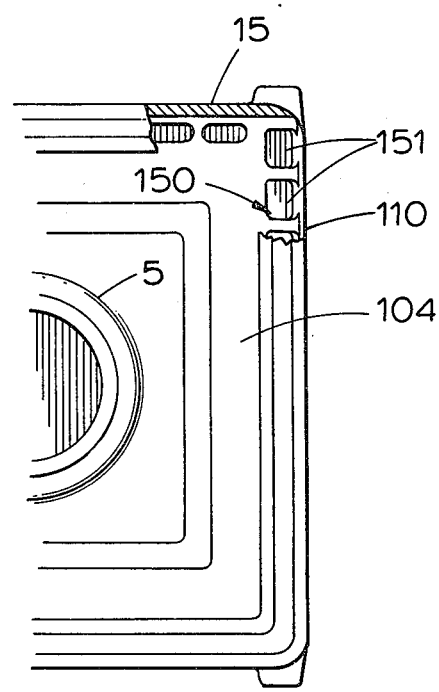
Figure 10:
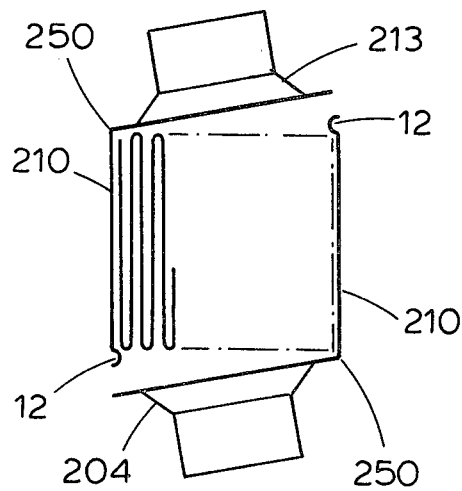
Figure 11:
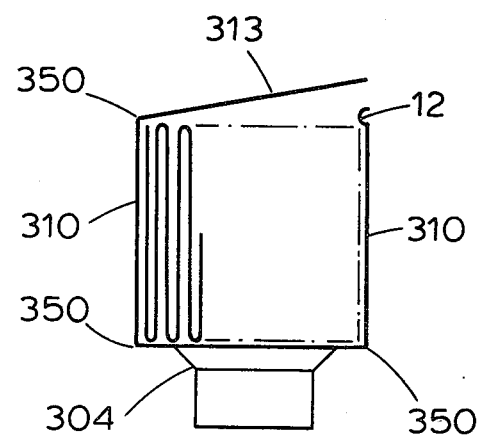
Figure 12:
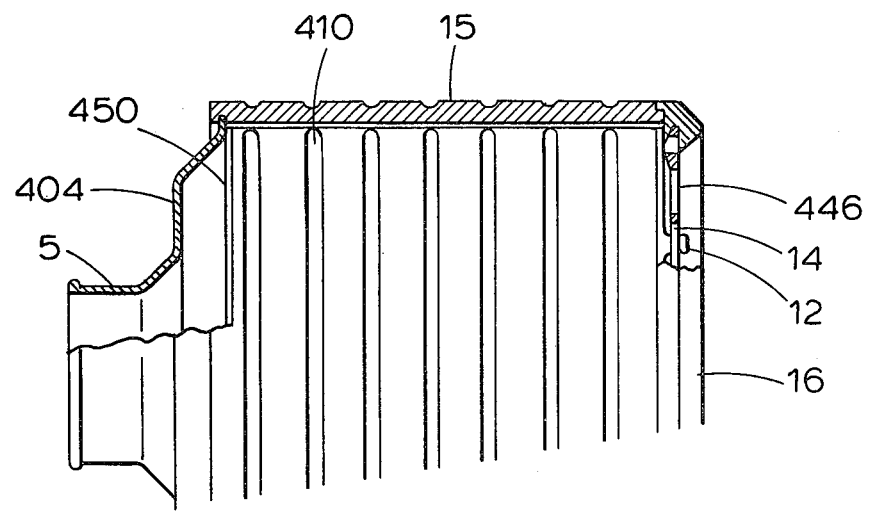
Figure 13:
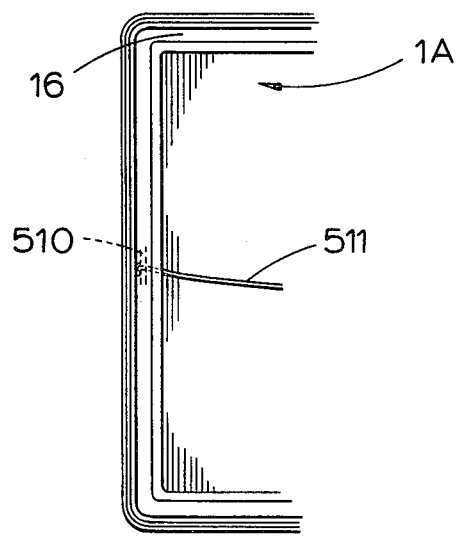
Figure 14:
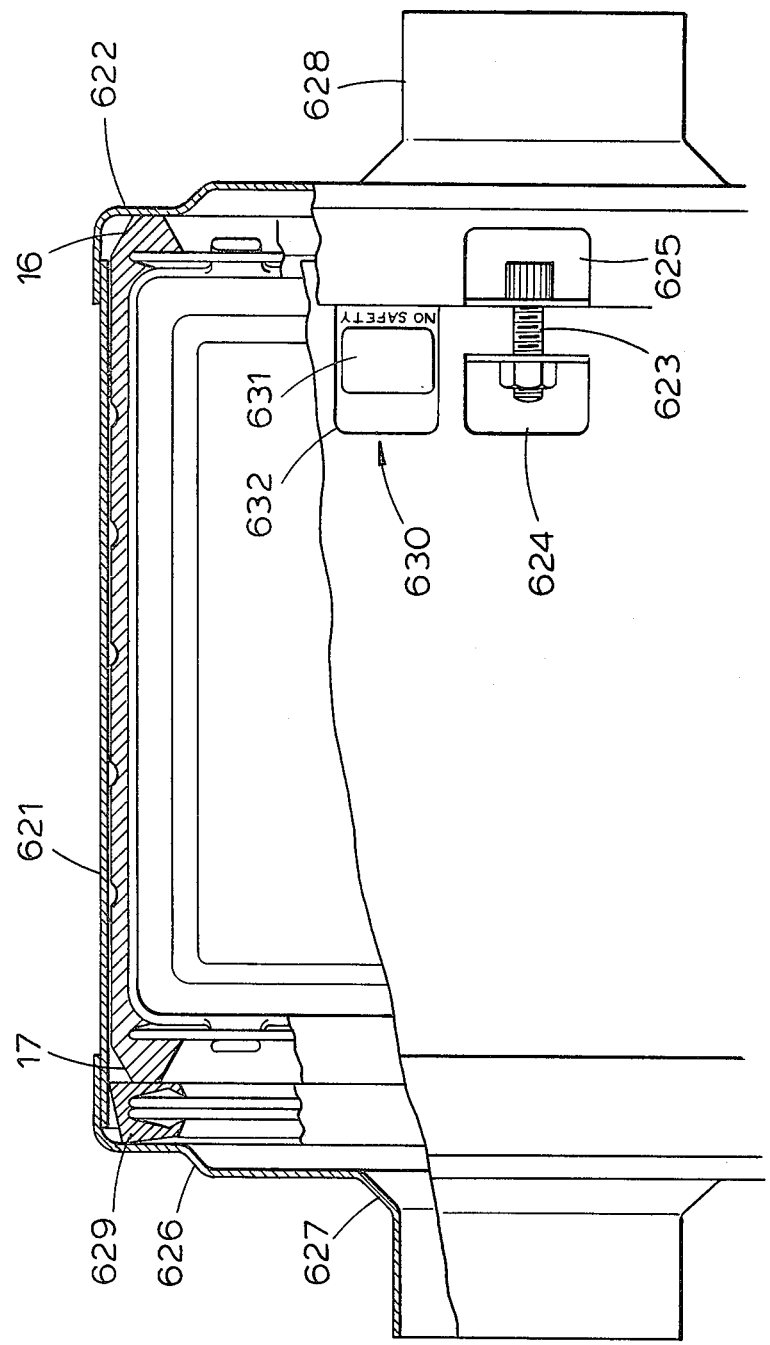

The above and other features of the invention will be explained with reference to preferred embodiments described by way of example. In the accompanying drawings:

FIG. 1 is a view partly in section and partly in side elevation of a filter element, FIG. 2 is a top end view of the filter element of FIG. 1, with a portion shown in section, FIG. 3 is a partial section of the element of FIG. 1 taken on the line III—III, FIGS. 4, 5 and 6 are similar to FIGS. 1 to 3 but show a modified form of filter element, FIG. 7 is a bottom end view of the modified element of FIGS. 4 to 6 with parts in section, FIGS. 8 to 11 show diagrammatically in axial section four different forms of filter element and their method of assembly, FIG. 12 shows in axial section yet another filter element, FIG. 13 shows a variation on the FIG. 12 element, and FIG. 14 shows in partial axial section an element according to the invention assembled in a casing.

Referring to FIGS. 1 to 3 of the drawings, the filter element there shown comprises two blocks 1A and 1B of pleated paper. The blocks 1A, 1B are similar in section, the section being taken transversely to the general direction of air flow through the element shown by the arrow C. The blocks 1A and 1B are arranged in series. The block 1A is of very much greater depth than the block 1B. The block 1A performs the major part of the filtering function and it is intended that in normal operation the block 1B should provide negligible resistance to air flow. However, if the block 1A is perforated, dust is prevented from reaching the outlet by the block 1B. Because it is relatively shallow the block 1B will quickly clog and the element can then be replaced. The block 1B functions as a safety element.

Individual pleats of the two blocks are indicated at 2 in FIG. 3 and individual fold-lines at 3.

The bottom member 4, rectangular in plan, is moulded of relatively rigid plastics and has a central outlet opening 5; its peripheral area 6 formed with a series of holes of which only one is shown at 7.

A first pair of side walls 10 made of relatively rigid plastics material extend over end pleats of the blocks 1A, 1B. The side walls 10 each have at bottom and top hook-like projections 11, 12. The lower projections extend through holes 7 in the bottom member to form hinge-like connections therewith.

The side walls 10 are connected at the top by a top member in the form of a grid 13 having a series of holes 14 at its peripheral area. The upper projections 12 on the side walls 10 extend through holes 14. Outward pressure of the blocks 1A, 1B urges the side walls apart and so keeps the hook-like projections 11 and 12 in engagement. The filter element thus far assembled can be handled as a unit.

The filter element is made by assembling the blocks 1A, 1B, with only slight separation between them, upon the bottom member 4, with the side walls 10 hooked on to this member. The side walls 10 are then brought from open position to that illustrated where they are parallel. They are then secured by the grid 13 as described.

A second pair of side walls 15 is then formed on the element by dipping, from e.g. foamed polyurethane.

End flanges 16, 17 are now formed at top and bottom of the element. These are conveniently made of foamed polyurethane, in a mould (not shown).

The plastics material of the second side walls 15 and end flanges 16, 17 merge to form an integral structure. The plastics material of the end flanges 16, 17 flows into the peripheral holes 7 and 14 in the bottom and top members to form a secure interconnection.

The filter element can be used with or without casing. If desired it can be used with an air pre-cleaner.

The filter element of FIGS. 4 to 7 is generally similar to that of FIGS. 1 to 3 except that the side walls 110 and bottom member 104 are formed as parts of one integral moulding instead of being separate mouldings. The side walls 110 and bottom member 104 are joined by an integral hinge 150 formed by an area with a series of openings 151, and the whole is moulded flat, after which the walls 110 are erected around the blocks 1A, 1B. On formation of the lower flange 17, the material enters the holes 151 and rigidifies the hinge 150 as well as rendering the element impervious and forming the necessary sealing with the paper block 1B.

In other respects the embodiments are the same. The same reference numberals are used for similar parts, which will need no further description.

The seals made with the end pleats 3 are shown in FIG. 6 at 152: similar seals are formed in the first embodiment but not shown in FIG. 3. To facilitate understanding of the drawing, the holes 7, 14, 151 are shown open. In the completed element they are filled with the material of the flanges 16, 17. This rigidifies the hinge joints at top and bottom.

FIGS. 8 to 11 show diagrammatically four different ways of making a filter element according to the invention.

Figure 8:
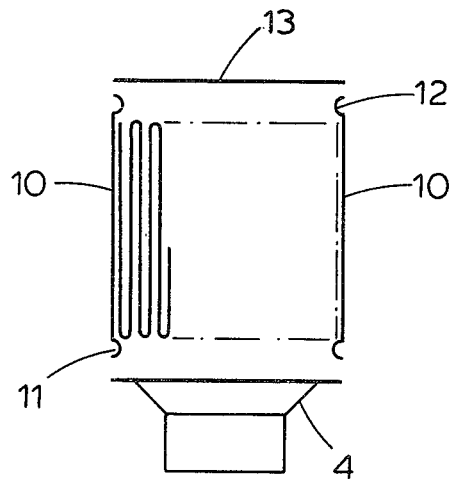

FIG. 8 shows in essence the first embodiment, shown in FIGS. 1 to 3, where top and bottom members 13, 4 and side walls 10 are all separate parts connected together. The side walls 10 are identical mouldings. Members 13, 4 could if desired be made the same shape, to require only one moulding. This arrangement minimises tooling cost.

Figure 9:
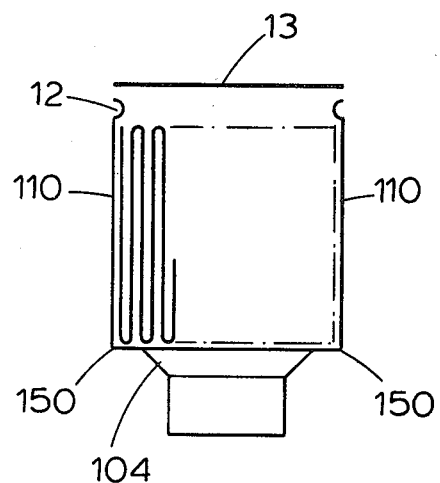

FIG. 9 is equivalent to the second form of filter element, illustrated in FIGS. 4 to 7. Here, bottom member 104 and sides 110 are one integral moulding, which increase tooling cost but reduces assembly time.

In FIG. 10, end members 204, 213 are similar and each is moulded integrally with one side wall, 210, end member and side wall being moulded flat and joined by an integral hinge 250 similar to that illustrated at 150 in FIGS. 4 to 7. A single mould will suffice. In assembly, the mouldings are wrapped around the paper blocks 1A, 1B. (A single block 1 only is shown to simplify the drawing). The free edges of the side walls and end members are connected by engaging hook-like projections 12 on the latter (similar to the elements 12 of FIGS. 4 to 7) into peripheral holes in the end members. Formation of the second side walls and flanges rigidifies the construction.

FIG. 11 illustrates yet another arrangement where the end members 304, 313 and side walls 310 are all one integral moulding, moulded flat with hinges 350, as at 150, between the parts. The element is assembled by wrapping the moulding around the paper blocks and securing the free edges by projections 12 entering corresponding holes. As before, formation of the second side walls and flanges rigidifies the construction. While this arrangement involves heavier tooling cost, it further reduces assembly.

FIG. 12 illustrates an embodiment rather like that of FIGS. 4 to 7, except that the hinge between side walls 450 between the side walls 410 and bottom member 404 is formed by a thin section which is imperforate. No bottom flange is formed as at 17 in FIGS. 1 to 3 and 4 to 7. The material of the second side walls 15 suffices to seal the paper block at the lower end of the element. At the top, a grid 446 is connected to the side walls as shown in FIG. 3. A flange 16 around the grid 446 merges with the second side walls and embeds the connection thus rigidifying the construction.

In some circumstances a flange can be formed on the bottom member only.

FIG. 13 shows a top view of another element, for example like that of FIGS. 1 to 3, where a top member as such is eliminated. The side walls 510 are connected by a string 511 prior to formation of the second side walls and flange 16, and the flange by itself gives sufficient rigidity to the top element.

FIG. 14 shows the filter element of FIGS. 1 to 3 (with outlet 5 removed) within a casing 621, and enclosed by a removable cover 622 held on to the casing by a nut and bolt arrangement 623 acting between brackets 624, 625 on the casing and cover. The casing 621 has a dished bottom 626 leading to an outlet 627. The cover 622 is also dished, with an inlet 628. The filter element together with a safety element designated generally 629 is sealed within the casing by compression of the end flanges 16, 17 against the cover 622 and casing bottom 626, to prevent dust entraining air leaking past the filter element to the outlet. The sealing pressure is obtained by properly tightening the nut and bolt arrangement 623.

An indicator device 630 is provided on one of the filter element side walls 10 to show whether the filter element has been properly installed. This device 630 comprises a lug 631 projecting from the wall 10 and visible in a cut-out 632 in the casing wall, which forms a window. The lug 631 carries the inscription NO SAFETY as shown. If the cover 622 is assembled on the casing 621 without the filter element inside, this is apparent from the fact that nothing shows in the window. If the element is inserted, but without the safety element, the element goes to the bottom of the casing and the words NO SAFETY show in the window 632. With the safety element inserted, when the nut and bolt are fully tightened to make a proper seal at the bottom flange 17 (which is the more important sealing location) words NO SAFETY are concealed by the casing. The lug 631 also prevents the filter element from being inserted wrong-end-up in the casing and provides a handle to facilitate removal of the filter element.

The filter element first side walls and end members (such as 10, 4, 13 in FIGS. 1 to 3) can conveniently be made of polypropylene, though other plastics materials can also be used. Where no hinging between integral parts is needed in erection these parts can be made of steel.

Instead of foamed polyurethane for the second side walls and flange(s) (such as 15, 16, 17 in FIGS. 1 to 3) other elastomeric materials can be used. All these parts are preferably made of the same material and the arrangement should be such that the material of these parts merge or weld together to rigidify the construction.

The hinge connections can be variously formed but a common characteristic will be that they require rigidification.

I claim:

1. A method of making a filter element of the type employing a block of deep pleated paper comprising the steps of
    providing bottom and top end support members of relatively rigid material each end member having a rectangular peripheral portion defined by first and second pairs of opposed peripheral edges and, within it, an opening for air flow,
    providing a first pair of side walls, the first pair of edges of the peripheral portion of the members and the end edges of the first pair of side walls being connected by hinge connections along at least two pairs of adjacent edges,
    placing the bottom and top members and said first pair of walls around a block of deep pleated paper with the sides of the pleats extending generally parallel to the first pair of side walls,
    connecting the previously unconnected pair or pairs of edges of said members and first pair of side walls, the connection being formed by interengaging elements at the adjacent edges,
    forming from an elastomeric material settable in situ a second pair of side walls extending over and sealing the ends of the pleats of the block, the second pair of side walls extending between the end members at corresponding opposite, second edges of their peripheral portions and between the adjacent side edges of the first pair of side walls with which they effect a seal, and
    forming also from an elastomeric material settable in situ peripheral flanges at the first pair of peripheral edges of the peripheral portion of both end members in sealing relationship with the adjacent edges of the first pair of side walls, the flanges sealing the side pleats of the pleated paper, and embedding the interengaging elements.

2. A method as claimed in claim 1, wherein the block of paper is placed on the bottom member, and the side walls are connected by the top member by projection and hole connections at opposite edges thereof, the top member holding the side walls together against the outward pressure of the block prior to forming the sealing structure.

3. A method as claimed in claim 2, wherein prior to connection of the top member projection and hole hinge connections are formed between the side walls and the bottom member.

4. A method of making a filter element of the type employing a block of deep pleated paper, comprising the steps of:
    providing a bottom end support member of relatively rigid material having a rectangular peripheral portion defined by first and second pairs of opposed peripheral edges and, within it, an opening for air flow,
    providing a first pair of side walls hinged to the peripheral portion of the bottom member at the first pair of opposite edges thereof,
    placing a block of deep pleated paper between the side walls with the pleat sides generally parallel thereto,
    connecting the first pair of side walls together at the top of the block,
    forming from an elastomeric material settable in situ a second pair of side walls extending over and sealing the ends of the pleats of the block and extending between the side edges of the first pair of side walls with which they effect a seal, and
    forming also from an elastomeric material settable in situ a peripheral flange about the top of the block in sealing relationship with the top edges of the first pair of side walls and sealing the side pleats of the pleated paper.

* * * * *